April 2, 1968 H. L. FOX ET AL 3,375,840

MULTI-MODE FLUID DEVICE

Filed March 17, 1964 3 Sheets-Sheet 1

INVENTORS
HAROLD L. FOX
FABIO R. GOLDSCHMIED

BY Edward M. Farrell

ATTORNEY

April 2, 1968 H. L. FOX ET AL 3,375,840

MULTI-MODE FLUID DEVICE

Filed March 17, 1964 3 Sheets-Sheet 2

United States Patent Office 3,375,840

Patented Apr. 2, 1968

3,375,840

MULTI-MODE FLUID DEVICE

Harold L. Fox and Fabio R. Goldschmied, Salt Lake City, Utah, assignors to Sperry Rand Corporation, New York, N.Y., a corporation of Delaware Filed Mar. 17, 1964, Ser. No. 352,468

2 Claims. (Cl. 137—81.5)

Figure 1:
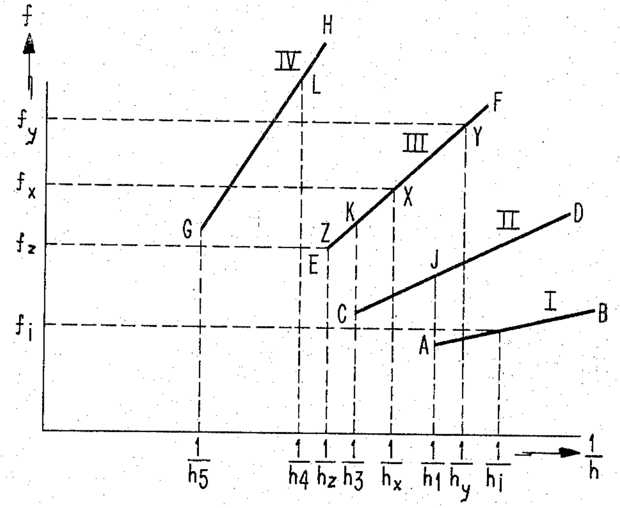
FIG. 1 PRIOR ART

The invention relates generally to fluid logic devices of the type which utilizes no moving parts, and more particularly to a fluid device which is capable of providing high speed and high gain digital operations.

Fluid devices having no moving parts, except the fluid itself, are well known in the art. They are generally called pure fluid devices. An example of a pure fluid device is a pure fluid amplifier. Such amplifiers are of various types, two of which have come particularly to the fore, namely the momentum exchange amplifier and the boundary layer control or wall attachment amplifier. In a momentum exchange amplifier, a control stream is directed against the side of the power stream and deflects the power stream away from the control stream.

In a boundary layer control or wall attachment amplifier, the power stream is directed to a target area or outlet channel by the pressure distribution in the boundary layer of the power stream. This pressure distribution is controlled by the wall configuration of the interaction chamber, the energy level of the power stream, the fluid transport characteristics, the back loading of the outlet channels and the flow of control fluid into the boundary layer region. The selective deflection of the power stream into one outlet channel or the other is controlled by introducing control fluid into the boundary layer of the power stream.

Fluid devices capable of generating fluid pulses, or oscillators, are also known. They generally utilize a negative feedback passageway from one or more output channels to a respective control stream orifice, so that a portion of the power stream flow through an output channel eventually results in a control stream which switches the power stream to another output channel. Thus, the power stream switches back and forth between the output channels in cyclic fashion. The frequency thus produced depends upon the finite length of the negative feedback passageway. The pulse frequency may be changed by changing the length of the feedback passageway. Other means to control the frequency may be employed either singly or in combination with the above dimensional change. For example, the pressure threshold level in the feedback passageway may be controlled.

It is a primary object of the present invention to provide an improved fluid logic device.

It is an object of this invention to provide an improved pure fluid oscillator capable of operating at different ranges of frequency.

It is a further object of the invention to provide a pure fluid digital device utilizing the edge tone effect.

It is another object of the invention to provide a pure fluid device utilizing the effect of cavity resonance.

It is another object to provide a pure fluid pulse generator capable of selectively producing one of a plurality of output frequencies.

It is another object of the invention to provide a fluid device capable of producing pulses in a plurality of selectable modes of operation while in each selected mode of operation the pulses are produced in a selected one of a plurality of distinct frequency ranges.

It is another object of this invention to provide an improved dynamically stable device.

It is another object of the invention to provide a fluid pulse generator capable of producing fluid pulses at a higher frequency than was heretofore possible.

It is another object of the invention to provide a fluid amplifier having a higher gain and a higher switching speed than heretofore obtainable.

It is another object of the invention to provide a pure fluid device in which the functions of oscillation and amplification may be combined.

It is another object of the invention to provide a fluid device capable of generating fluid pulses in a plurality of distinct controlled ranges of frequencies.

It is still a further object of this invention to provide an improved fluid device which may be used as OR and AND logic elements.

In accordance with the present invention, a fluid device is provided which may be used as a fluid oscillator or as a logical element with high gain and fast switching speed. Means are provided to produce a dynamically stable oscillating power jet so that a small control signal is capable of producing a switching action.

Figure 2:
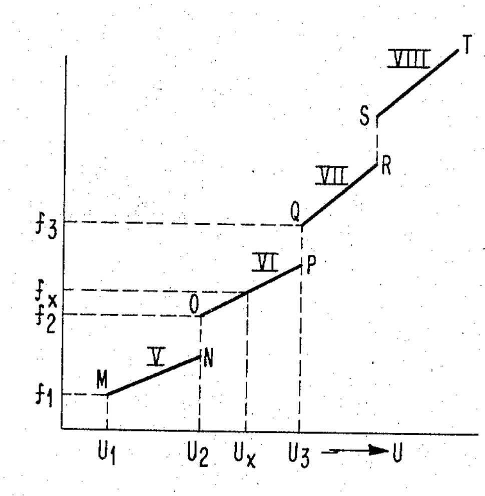
FIG. 2 PRIOR ART
Figure 3B:
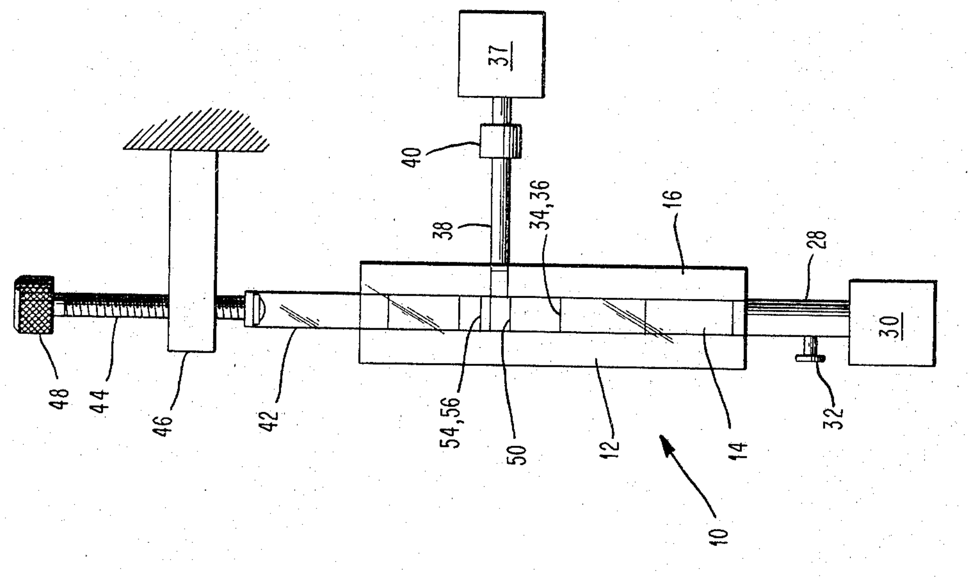
Figure 3A:
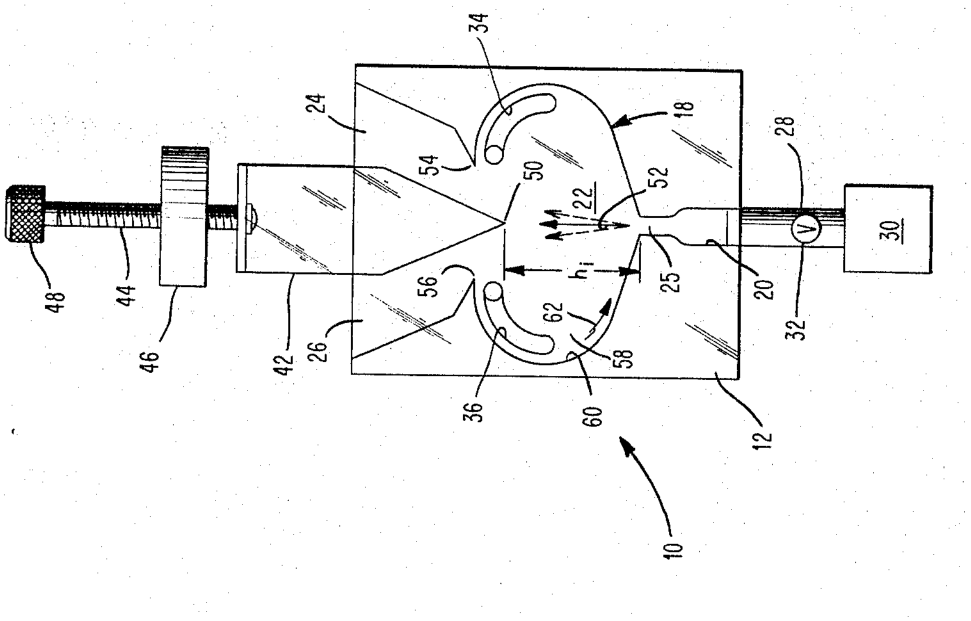
Figure 4:
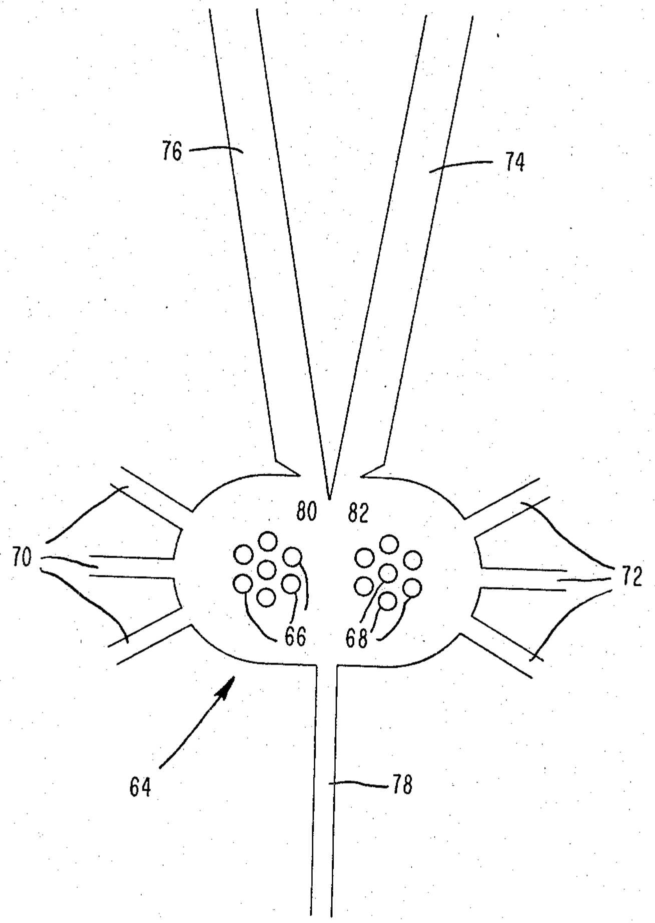

The above and still further objects, features and advantages of the invention will become apparent from the following description and the accompanying drawings in which:

FIGURES 1 and 2 are graphs shown to illustrate the characteristics of devices which may be incorporated in one form of the present invention to provide different modes of operation;

FIGURE 3*a* illustrates a plan view of a fluid device, in accordance with the present invention;

FIGURE 3*b* illustrates a side view of the device of FIGURE 3*a*;

FIGURE 4 is a plan view of another embodiment of the present invention involving a bistable device with multiple inputs.

In order to better understand some of the features and characteristics of the present invention, a brief description will now be given of the edge-tone phenomenon with particular references to FIGURES 1 and 2. In describing this, it is assumed that a jet of air is directed from a nozzle towards a wedge having a relatively sharp edge to product oscillations.

A detailed report on the edge-tone phenomenon is contained in the artitcle "The Vortex Motion Causing Edge Tones" by G. B. Brown, Proceedings of the Physical Society (London), 49, 493 (1937). The article discusses experiments performed on an edge-tone system comprising a wedge and a nozzle, the wedge being movably mounted so that the distance between its edge and the nozzle can be varied.

It appears that a change in frequency of the edge-tone may be caused by either changing the distance between the edge and the nozzle, keeping the fluid flow velocity constant, or by changing the flow velocity and keeping the nozzle-edge distance constant.

The graph of FIG. 1 illustrates the first situation. The abscissa of the coordinate system represents the reciprocal value $1/h$ of the distance $h$ betweeen nozzle and edge. The ordinate of the coordinate system represents the frequency $f$ of the tone produced, when fluid from the nozzle is directed against the edge at a constant speed U.

The graph illustrates that the change in frequency with the change in distance is discontinuous and occurs in four distinct steps, providing for a stage in between two steps or frequency jumps wherein the frequency is linear. In the graph, these frequency stages are indicated by the numerals I, II, III and IV.

It is seen that in each stage, for example, with a given distance $h_1$, there corresponds a certain frequency $f_1$. Considering an operation on stage I if the edge distance $h_1$ is increased (e.g. when $1/h$ decreases) the frequency $f_1$ decreases linearly to a certain point A. When an edge distance reaches point A, the frequency suddenly jumps to a higher value represented by the point J and starts to operate in stage II.

A further increase in the edge distance while operating in stage II, causes the frequency to decrease again until an edge distance $h_3$ is reached where a similar frequency jump from points C to K occurs. From point K, the frequency again further decreases with increasing $h$, until another critical distance $h_4$ is reached at which the frequency again jumps to point L. From here, as before, the frequency decreases with increasing $h$. At a distance $h_5$, corresponding to the point G, the frequency is no longer regular and the frequency range below this point is, therefore, not considered here.

If the graph of FIG. 1 is retraced, i.e. if the wedge is lowered downwards toward the nozzle thereby decreasing the distance $h$, the sequence of events is substantially the same.

In the graph illustrated by FIG. 2, the abscissa of the coordinate system represents the flow velocity of the fluid striking a jet-edge system; the ordinate represents the frequency $f$ of the oscillations resulting at the edge. The graph is obtained by directing a blade-like stream of fluid against the edge of a wedge at various flow velocities U, keeping the distance between the nozzle and the edge constant, and plotting the frequency $f$ of the oscillation generated at the edge. It is seen in the graph of FIG. 2 that, similar to the graph of FIG. 1, the change in frequency with the change in flow velocity is discontinuous and occurs in four distinct steps, providing for a stage between two steps or frequency jumps, wherein the frequency is linear. In the graphs these frequency stages are indicated by the numerals V, VI, VII and VIII.

It is seen in the graph of FIG. 2, that, similar to the phenomenon explained with respect to FIG. 1, if for a certain distance $h$ between nozzle and edge, a certain frequency is obtained. When the velocity is increased gradually, a sudden jump in frequency occurs.

For example, beginning with a flow velocity $U_1$, a frequency $f_1$ is generated. An increase in flow velocity brings about a linear increase in frequency. By increasing the flow velocity gradually, a linear frequency range M–N is obtained, indicated by numeral V. If the velocity reaches a value $U_2$, a sudden jump in frequency occurs, the frequency changing to value $f_2$, which is the lower frequency limit O of frequency range VI. Increasing the velocity U in the range VI causes a linear increase in frequency until the velocity reaches a value $U_3$. At this velocity, a sudden jump in frequency again occurs to the value $f_3$, which is the lower limit Q of frequency range VII. Thus it is seen, that by a gradual increase in flow velocity, oscillations are generated in four distinct linear ranges of frequency. Experiments have shown that the frequency is completely determined by the distance $h$ and the flow velocity U.

In a way of operating the device according to the invention, to be described, use is made of the above explained phenomenon.

Referring to FIGS. 3*a* and 3*b* of the drawing, the device 10 according to the invention is formed by three sheets 12, 14 and 16. Sheet 14 is positioned between sheets 12 and 16 and is tightly sealed between them by suitable means such as screws. The sheets 12, 14 and 16 may be of any metallic, plastic or other suitable material. For the purpose of illustration, the sheets 12, 14 and 16 are shown as being of a transparent material.

The sheet 14 may have a cut-out section which may be provided by means of a cutting or stamping operation. The entire cut-out section is designated as a configuration 18. The configuration 18 includes a fluid supply inlet 20, a chamber 22 and two outlets channels 24 and 26.

The inlet 20 forms a nozzle 25 opening into the chamber 22. The cross-section of nozzle 25 is substantially rectangular such that fluid passing through it will issue as a blade-like stream.

The supply inlet 20 communicates with a tube 28 connected to sheet 14. Tube 28 is connected to a source 30 of fluid under pressure. The fluid under pressure may be air or a gas or water or other liquid. A fluid regulating device, such as a valve 32, is used in conjunction with the fluid source 30 to supply a constant flow of fluid at various pressure levels and flow velocities to the device 10. Such a fluid regulating device may be of conventional construction.

Openings 34 and 36 in sheet 16 form control orifices opening into chamber 22. A tube 38 connects orifice opening 34 with a source of control fluid 37 under pressure. A device 40, which may for example be a pressure transducer, is used to selectively cause a fluctuation or variation in pressure in the control fluid carried in tube 38. A similar arrangement as described for control orifice 34 is also provided for control orifice 36.

A wedge 42 extends into chamber 22. The wedge is slidably mounted between the plates 12 and 16. The wedge is supported by a threaded spindle 44 which in turn is supported by a block 46 which is fixedly mounted to a suitable support. The spindle 44 is rotatably connected with the wedge 42. By turning knob 48 in the proper direction the distance between the edge 50 of the wedge 42 and the nozzle 25 may be accurately controlled. The described guidance of the wedge 42 is such that its edge 50 is parallel to the long axis of the rectangular nozzle 25.

Fluid flowing from source 30, entering the device through inlet 20 is assumed to be at a certain pressure above atmospheric pressure. As the stream of fluid is reduced in cross-sectional area in the nozzle 25, its velocity increases. The stream 52 of reduced cross-sectional area leaving nozzle 25 and entering chamber 22, is called the power stream of the device.

If the power stream 52 strikes the edge 50 of wedge 42, a so-called edge-tone is generated. The term edge-tone is used here and in the following as is customary in acoustics, i.e. regardless whether or not the tone is audible. In acoustical experimentation, as well as in the investigations in connection with the present invention, the tones may be observed visually by means of a smoke generator and stroboscopic equipment and or with moving film equipment. The phenomenon of edge-tones i.e. fluid oscillations or vibrations which arise when a thin blade-like stream of fluid impinges on an edge is well-known in acoustics. The edge-tone phenomenon presents an acoustical-hydrodynamical problem which has not yet been solved completely. Generally it has been established that these tones are functions of the velocity of the fluid leaving the nozzle and the distance between the nozzle and the edge.

Acoustical experiments have shown that when the fluid stream maintains itself in oscillation at the flow dividing edge, it executes any of number of different characteristic motions, depending on the stream velocity and other parameters. If parameters are varied, the motion may sometimes be made to change suddenly from one of another of these forms, and the pertaining tone frequency simultaneously undergoes a sudden shift or jump. The various forms of oscillation are generally called stages of the fluid stream edge or jet-edge system.

A striking feature of the observed flow patterns is the periodic shedding of vortices from alternate sides of the dividing edge, which accompanies whipping of the fluid stream back and forth across the apex (50) of the wedge.

Referring to FIGURE 1 along with FIGURE 3, if the power stream 52 strikes the edge 50 of the wedge 42 an edge-tone is produced whose frequency depends, for a given constant flow velocity of the power stream on the distance of the edge 50 from the nozzle 25. Assume that for the given flow velocity $U_x$ at nozzle 25, and a distance $h_x$, the generated frequency is $f_x$. This situation corresponds to operation on point $x$ in stage III of FIGURE 1.

Assume, that an increase in frequency is desired to the value $f_y$, corresponding to point $y$ in edge III. For this purpose, knob 48 of spindle 46 is turned in such a direction that the wedge edge 50 approaches the nozzle 25.

As soon as the distance of the wedge has reached a value $h_y$, the corresponding frequency of the oscillations at the edge is $f_y$.

If, on the other hand, the frequency is to be lowered, the knob 48 is turned in the reverse direction, so that the edge is moved away from the nozzle. If for example, a distance $h_z$ is reached, the frequency will have decreased to the value $f_z$.

If it is desired to operate the device at a different frequency range, for example range II, the wedge 42 is moved to the distance which, for the given flow velocity, causes the device to oscillate in frequency stage II. Once in this stage, the device may be adjusted by means of knob 48 to generate the frequency desired, which fall within the limits C–D of frequency range II.

As mentioned above, in a jet-edge system, a variation of frequency may also be obtained by a variation in flow velocity of the fluid supply issuing from the nozzle while keeping the nozzle-edge distance constant. This situation is illustrated in FIGURE 2.

In this mode of operation, the flow velocity U is increased gradually, while the distance between the edge 50 of the wedge 42 is maintained at a constant value. The wedge 42 is assumed to be secured in the support 46 so that the distance from nozzle 25 to edge 50 is constant. The velocity of the fluid flowing from the source 30 into the device is controlled by the valve 32 and is adjusted to a value to produce the desired frequency.

Assume that the flow velocity corresponds to a value $U_x$ in the graph of FIG. 2. The graph indicates that, at this flow velocity, a frequency $f_x$ is generated within range VI. If the flow velocity is decreased, the frequency decreases linearly until point O is reached. If the velocity is increased, the frequency increases linearly until the value $U_3$ is reached. When $U_3$ is reached, the frequency jumps to the value $f_3$, as explained above. It is therefore seen that by varying the flow velocity U, a desired output frequency at the outlets 24 and 26 may be obtained which is dependent upon the supply velocity U and the distance *h*, these values being related to each other in the manner illustrated by the graph in FIG. 2.

It will be understood that in both ways of operation, described above, the device according to the invention, operates as an oscillator. More specifically, the device is seen to be capable of generating selectively four distinct ranges of frequency, the ranges either being determined by a constant supply velocity and a varied edge-nozzle distance, or a constant edge-nozzle distance and a varied flow velocity. The mode of operation of the device, comprising both ways of operation explained above, will herein be referred as the edge-tone mode of operation.

The above discussion relating to edge-tone oscillations illustrates how an oscillator of one variable frequency may be produced in a fluid device. Subsequent discussion will describe how the same device may be used to generate oscillations of different frequencies.

If the device illustrated is generating edge-tone oscillations and control fluid of sufficient energy level is momentarily applied at the control fluid inlet orifice 34, the power stream 52 is caused to move over towards the left hand side of the device. A low amplitude self-sustained oscillatory motion between the wedge 42 and cusp 56 is then established along with a transverse pressure gradient which causes the fluid power stream issuing from nozzle 25 to be deflected to the left. Similarly, a low amplitude self-sustained oscillatory motion is established between wedge 42 and cusp 54 by momentarily applying a control fluid of sufficient energy at the control fluid inlet orifice 36 which also results in a transverse pressure gradient causing the fluid power stream issuing from nozzle 25 to be deflected to the right.

By applying control signals to the inlets 34 and 36 to produce output signals about the cusps 56 or 54, respectively, it is seen that a bistable device is obtained. The switching from one cusp to the other may be attained by the application of a relatively small control signal. Hence, the device may be said to be very sensitive, have high gain, and fast switching time. As is well known, once a fluid amplifier is switched to one outlet, it will remain at that outlet even after the control signal is terminated. Of course, if desired, for high stability the control signal may be continued to be applied even after the initial switching.

The switching operation is generally similar to that involved in conventional pure fluid amplifiers. The switching is generally called momentum exchange switching, i.e. the momentum of the control fluid contacting the power fluid causes the power stream to deflect out of the position where it oscillates with respect to the edge, and to force it over to the left hand side of the device. Once the fluid stream arrives at the left hand side of the device, the power stream remains, due to the boundary layer effects present in chamber 22, on this side and in its oscillatory motion. The frequency of oscillation in this mode of operation is determined by the same parameters as in the edge-tone mode of operation described above. That is, the frequency may either be determined by the combined parameters constant distance *h* and varied flow velocity U, or the combined parameters of varied *h* and constant flow velocity U.

The oscillating motion of the power stream with respect to the cusp 56 is not the result of an edge-tone effect, but is better explained by pointing to the presence of the vortex chamber 58 which acts as a cavity resonator. Basically, a cavity resonator comprises an orifice issuing a fluid stream at a certain minimum pressure, which stream impinges upon a sharp edge which forms one of the bounds of a cavity. Experiments have shown that a cavity resonator may have three modes of operation dependent upon the pressure of the supply fluid. While some of the basic theory involving the oscillations of the cavity resonators is not clearly understood, an explanation of the probable theory of operation is presented.

The mechanism of the cavity resonator is usually explained by realizing that a portion of the fluid impinging on the sharp edge of cusps 54 or 56 is split off and is guided along the wall of the adjacent cavity and from there returned to the base of the fluid stream. Here the returned fluid impinges upon the side of the main fluid stream and, probably as a result of a fluid momentum exchange at the base of the fluid stream the latter is deflected to the right and away from the cusp edge.

When this occurs, the split off portion of the fluid entering the cavity is greatly reduced and its momentum with respect to that of the main fluid stream is insufficient to sustain the fluid stream in its deflected position. The fluid stream thereupon regains its original path in which it will again strike the sharp edge of a cusp and the subsequent cycle of operation is herewith initiated.

It is believed that the oscillation of the power stream 52 about cusp 56 is caused as follows. If the power stream 52 upon switching from its edge-tone mode, approaches the cusp 56, a portion of the power stream fluid is split off by the sharp cusp and is guided along the wall 60 of compartment 58 of the chamber 22 back in the direction of the nozzle 25. This split off portion stream 62 of fluid is seen to collide with the power stream 52 resulting in a known momentum exchange and causing deflection of the power stream to the right toward wedge 42. As a result the power stream fluid is no longer split by cusp 56 and the split off portion stream 62 of fluid ceases to flow. Thereupon the transverse pressure gradient deflects the power stream 22 to cusp 56, causing again return fluid to be formed to deflect the power stream as explained above. It will be understood that the compartment 58 functions as a cavity resonator with respect to the power stream flowing from nozzle 25.

A train of fluid signals or oscillations are obtained at the outlet channel 26. The frequency of the signals at the outlet is dependent on the dimension and acoustical properties of the resonators and also on the flow velocity of the power stream. In more particular, the frequency of oscillation about the cusp 56 will be a function of the length of the resonator wall 60 which defines the length of the feedback path for the feedback component 62. Experiments show that for a given resonance cavity, the frequency also depends on the supply pressure (flow velocity) and that with variation of this pressure (velocity), three stages of oscillation may be established.

If a control signal of sufficient energy level is momentarily applied to the inlet 36, the fluid stream will be switched away from the cusp 56 towards the cusp 54 to produce an output oscillating signal at the outlet 24. In this mode, the operation is substantially the same as that described in connection with the switching of the fluid stream towards the cusp 56.

It is thus seen then that the device is capable of operating in three different modes. A first mode occurs when the main power jet plays on the edge 50. During this time the device operates as an edge-tone oscillator and an oscillatory output is simultaneously produced from both outlets 24 and 26. In the second mode, the jet 52 is deflected to the right to cusp 54, while in the third mode the jet is deflected to the left to cusp 56. In the second and third modes, the jet 52 oscillates about the corresponding cusp 54 or 56 to produce an oscillatory or modulated output from the corresponding outlet channel 24 or 26. In the latter two modes, the jet attaches to the corresponding cusp 54 or 56 due to the boundary layer effects present in chamber 22 and to the resultant transverse pressure differential across the jet when it is deflected to one of the cusps 54 or 56. Then due at least in part to the feedback typified at 62 the jet 52 will oscillate about the corresponding cusps as previously described to produce an output in one of the output channels 24 or 26. In a typical embodiment, the above action may be obtained by angling the lower wall sections of chamber 22 in the area of the nozzle 25 so that they form an angle of between 50 to 70° to the axis of the nozzle 25, and by slanting the side walls of the outlet channels 24 and 26 inwardly into the circular wall portions of the chamber 22 to form the cusps 54 and 56 at the entrance of the outlets 24 and 26 as shown in FIG. 3*a*. The cusps 54 and 56 are of course spaced from the wedge 42 so as to permit the attachment of the jet to the cusp when the jet 52 has been deflected.

Since the jet is in an oscillatory state during all of the above-described modes, a small control signal applied to the appropriate control inlet 34 or 36 will quickly switch the jet 52 from one mode to the other. In this context, switching from the first mode to either the second or third mode can be produced by a smaller control signal than is required when switching between the second and third modes. This is apparent since the angle of deflection for the jet 52 in passing from mode one to modes two or three is smaller than the angle of deflection in going from mode two to mode three or vice versa. Thus, it may be said that the present invention involves a multi-stable device which is capable of operation in more than two modes or states. This feature makes the present invention especially adaptable for use in computer systems.

For example the device of the invention, through connections of the inlets and outlets in an appropriate manner may be used to produce logical OR gates, logical AND gates, logical memory arrays, and the other logical circuits.

Referring particularly to FIGURE 4, there is illustrated another embodiment of the present invention, which may be employed as a fluid logic device. The device 64 may comprise top, middle and bottom plates, made of transparent plastic or other type material. The device is designed for bistable operation, with multiple inputs. The round circles 66 and 68 depict control ducts which may be located in the top cover plate to enter the vortex chamber from the top. The lines 70 and 72 depict control ducts which may be located in the middle plate of the device 64 and enter from the side of the vortex chamber wall. The device 64 includes a source of fluid connected to the inlet 78 and the basic construction of the device is similar to that illustrated in FIGURES 3*a* and 3*b*.

Ten control ducts on each side of the bistable device 64 are illustrated. A fewer or greater number of control ducts may be present depending on the application of the device. The device as depicted is symmetric so the device is bistatble, i.e., the flow is disposed to issue from either the outlet 74 or the outlet 76 and not favor one outlet over the other.

When the device 64 is operating as an OR gate, a large magnitude control signal applied to any one of the control ducts 66 or 70 on the left side of the device when fluid is flowing from the outlet 76 will cause the fluid to switch to the outlet 74. Similarly, when fluid is flowing at the outlet 74, a large magnitude control signal applied to any one of the control ducts 68 or 72 on the right side of the device 64 will cause the fluid to switch to the outlet 76.

When the fluid device 64 is to be used as an AND gate, control signals of relatively small amplitude may be employed. To operate as an AND gate, control signals must be applied simultaneously to more than one control duct before a switching operation will take place. A single control signal will not have sufficient magnitude to cause switching. For example, if fluid is flowing in the outlet 74, control signals applied to any two or more of the control ducts 68 and 72 on the right side of the element will cause the fluid to switch to the outlet 76.

When operated as a majority logic device, control signals must be present in at least a majority of the control ducts on the side of the device from which the flow is issuing before the device will switch to the opposite output.

When used as a logic element as in FIGURE 4, oscillations are produced as the power jet oscillates between the cusp and wedge. Thus the device may operate as a fluid oscillator by utilizing the edge-tone effect or as a logic element with high gain and fast switching speed. Of course, the device would normally not function simultaneously as an oscillator and a logic element.

Because the output signals about the edges 54 and 56 in FIGURES 3*a* and 3*b* are in states of oscillation, a small amount of control signal is all that is necessary to switch the signal from one edge to the other. Thus, a device of high gain, high sensitivity and high switching speed is provided. The same situation is true in connection with FIGURE 4 where edges 80 and 82 are provided.

It has thus been seen that the present invention has provided a fluid device capable of oscillation in at least three different ways, about edge 50, about the edge 56 and about the edge 54 in FIGURES 3*a* and 3*b*. The frequency at each of these edges may be varied over wide ranges by varying the physical dispositions of various parts or by controlling the input power of the fluid jet.

It is apparent that the device disclosed may be modified or used in a variety of ways without departing from the scope of the present invention. For example, the wedge 42 may be fixed if a range of different frequencies about the edge 50 is not desired. However, different or additional signal frequencies would still be capable of being produced about the edges 54 and 56.

The embodiments of the invention in which an exclusive property or privilege is claimed are defined as follows:

1. A fluid device comprising in combination, a symmetrical fluid interaction chamber, a fluid power inlet nozzle entering said interaction chamber along the axis of symmetry thereof, said nozzle being effective when charged with a pressurized fluid to issue a fluid jet along said axis of symmetry, a wedge-shaped divider element located along the axis of symmetry with its apex in confronting relationship to said nozzle, said divider element being spaced from said nozzle by a distance which is operative to induce an edge-tone oscillation in the power jet, said chamber being formed by a pair of lower wall sections each angling upward from opposite sides of said power nozzle and then a pair of upper generally circular wall sections, which terminate at their upper ends in spaced relation to the sides of said wedge-shaped divider, a pair of output channels located one on each side of said divider, said output channels being formed by the sides of said divider and a pair of wall members one on each side of the wedge-shaped divider, said wall members being spaced from and generally paralleling the sides of the divider element along their upper extremes and then slanting inwardly toward the divider along their lower extremes to terminate in the upper ends of the circular wall sections near the apex of the divider, the slanted portions of said wall members together with circular wall sections forming a cusp at the entrance to each of the output channels, said chamber walls being positioned relative to said axis of symmetry so that when the jet is deflected to one output channel or the other it will produce a transverse pressure differential thereacross which will in turn cause the jet to lock onto the cusp at the corresponding output channel, said cusp and circular wall section then being operative to feed back a small amount of fluid power to the power jet to thereby cause the jet to oscillate about said cusp, and fluid control ports entering the interaction chamber on each side of the axis of symmetry of said chamber.

2. A device as described in claim 1 wherein there are a plurality of control ports on each side of said axis of symmetry.

References Cited

UNITED STATES PATENTS

| | | | |
|---|---|---|---|
| 3,228,411 | 1/1966 | Straub | 137—81.5 |
| 3,276,463 | 10/1966 | Bowles | 137—81.5 |
| 3,282,280 | 11/1966 | Horton | 137—81.5 |
| 3,294,103 | 12/1966 | Bowles | 137—81.5 |
| 3,107,850 | 10/1963 | Warren et al. | 137—81.5 |
| 3,158,166 | 11/1964 | Warren | 137—81.5 |
| 3,170,476 | 2/1965 | Reilly | 137—81.5 |
| 3,177,888 | 4/1965 | Moore | 137—81.5 |
| 3,180,575 | 4/1965 | Warren | 137—81.5 |
| 3,181,545 | 5/1965 | Murphy | 137—81.5 |
| 3,199,782 | 8/1965 | Shinn | 137—81.5 |

M. CARY NELSON, *Primary Examiner.*

W. CLINE, *Assistant Examiner.*